United States Patent
Huh et al.

(10) Patent No.: US 8,447,033 B2
(45) Date of Patent: May 21, 2013

(54) METHOD FOR PROTECTING BROADCAST FRAME

(75) Inventors: Mi-suk Huh, Suwon-si (KR); Alexey Fomin, St. Petersburg (KR); Wong Marcus, Yongin-si (KR); Evgny Linsky, St. Petersburg (KR); Mikhail Stepanov, St. Petersburg (KR); Sergei Bezzateev, St. Petersburg (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1454 days.

(21) Appl. No.: 11/521,600

(22) Filed: Sep. 15, 2006

(65) Prior Publication Data

US 2007/0064939 A1 Mar. 22, 2007

Related U.S. Application Data

(60) Provisional application No. 60/716,960, filed on Sep. 15, 2005.

(30) Foreign Application Priority Data

Mar. 10, 2006 (KR) .................... 10-2006-0022761
Aug. 7, 2006 (KR) .................... 10-2006-0074081

(51) Int. Cl.
*H04L 29/06* (2006.01)
(52) U.S. Cl.
USPC .................. 380/212; 713/169; 713/171
(58) Field of Classification Search ........ 380/201; 455/410–411; 726/26–30; 713/168–170
See application file for complete search history.

(56) References Cited

U.S. PATENT DOCUMENTS

| 2004/0008840 A1* | 1/2004 | Ferguson ............... 380/28 |
| 2005/0086465 A1* | 4/2005 | Sapkota et al. ........ 713/150 |
| 2005/0182932 A1* | 8/2005 | Wheeler ................ 713/168 |
| 2005/0232426 A1* | 10/2005 | Konersmann et al. .. 380/277 |
| 2006/0101454 A1* | 5/2006 | Whitehead ............. 717/168 |

OTHER PUBLICATIONS

The TESLA Broadcast Authentication Protocol. By Adrian Perrig, Ran CAnetti, J.D. Tygar and Dawn Song. Published 2002.*
Perrig, A.; Canetti, R.; Tygar, J.D.; Dawn Song; "Efficient authentication and signing of multiast streams over lossy channels"; In: Security and Privacy, 2000. S&P 2000. Proceedings. 2000 IEEE Symposium on May 14-17, 2000 pp. 56-73.
Jun Yao; Anjun Zhao; Lei Guo; "A novel video multicast instant source authentication model based on digital watermarking and TESLA"; In: Communication Technology Proceedings, 2003. ICCT 2003. International Conference on vol. 2, Apr. 9-11, 2003 pp. 1719-1722 vol. 2.
Qing Li; Trappe W; "Reducing delay and enhancing DoS resistance in multicast authentication through multigrade security"; In: Information Forensics and Security, IEEE Transactions on vol. 1, Issue 2, Jun. 2006 pp. 190-204.

* cited by examiner

*Primary Examiner* — Eleni Shiferaw
*Assistant Examiner* — Phy Anh Vu
(74) *Attorney, Agent, or Firm* — NSIP Law

(57) ABSTRACT

A method and system for protecting a broadcast frame are provided. A frame broadcasted through a packet switching network is protected and a wireless LAN system is included. A current frame is authenticated based on a TESLA scheme. The authentication of the broadcast frame can be performed without a time difference.

9 Claims, 2 Drawing Sheets

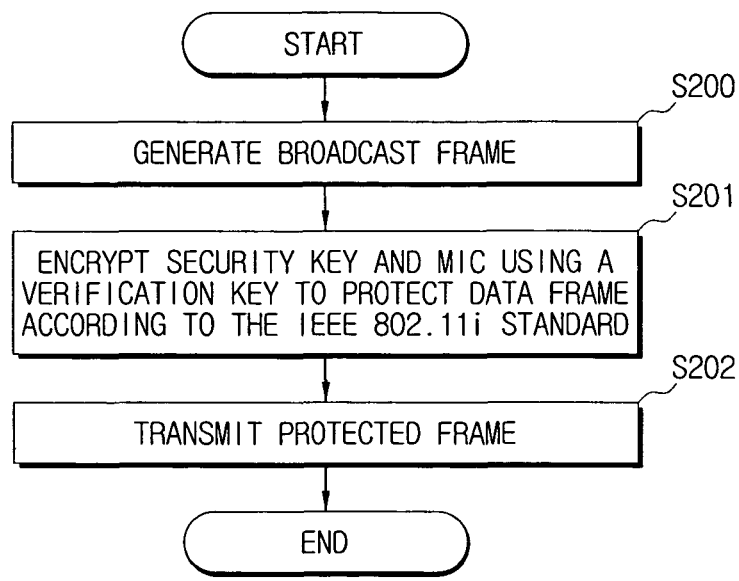
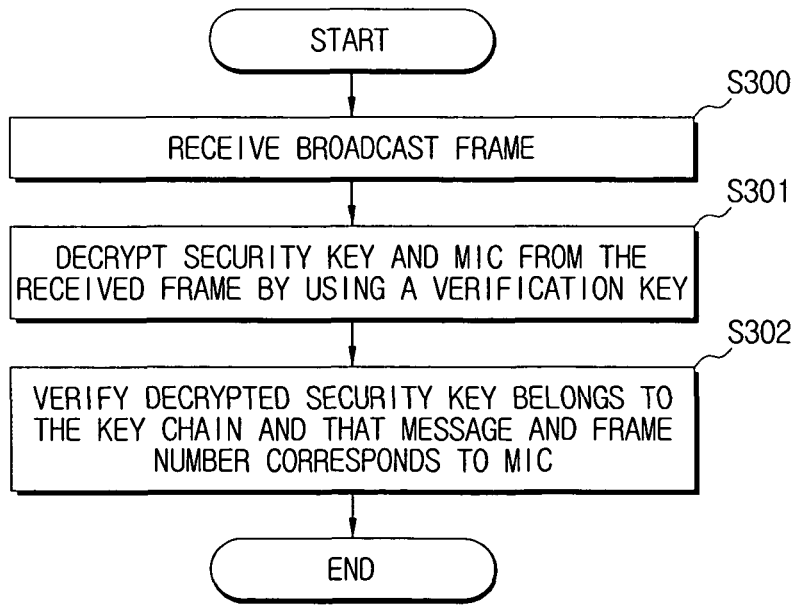

METHOD FOR PROTECTING BROADCAST FRAME

CROSS-REFERENCE TO RELATED PATENT APPLICATIONS

This application claims the benefit under 35 U.S.C. §119 (a) of Korean Patent Application No. 10-2006-22761 filed Mar. 10, 2006 and Korean Patent Application No. 10-2006-74081 filed Aug. 7, 2006 in the Korean Intellectual Property Office, and claims the benefit under 35 U.S.C. §119(e) of US Provisional Application No. 60/716,960 filed on Sep. 15, 2005 in the United States Patent Trademark Office, the entire disclosures of which are hereby incorporated by reference.

BACKGROUND OF THE INVENTION

1. Field of the Invention

The present invention relates to a method and system for protecting a broadcast frame. More particularly, the present invention relates to a method for protecting a frame broadcasted through a packet switching network by authenticating a frame based on a timed efficient stream loss-tolerant authentication (TESLA) scheme.

2. Description of the Related Art

According to the IEEE 802.11i standard, which is incorporated herein by reference, a security mechanism for protecting a data frame has been proposed, but no protection of a management frame has been considered. A TESLA scheme could be used for a broadcast frame authentication. In a TESLA scheme, a sender generates the key chain $\{K_0, \ldots, K_n\}$, where $K_i = H^i(RAND) = (H(\ldots H(RAND)))$, for example, $K_0 = H(K_1) = H(H(K_2))$ and $H(*)$, a one-way hash function, and publishes the verification key $K0$. The broadcast message M, sent in the period j, is protected using key $K_j$ in the following way: $M \rightarrow j\|K_{j-1}\|M\|MIC(K_{j,j}\|K_{j-1}\|M)$, wherein MIC represents the message integrity code.

Message M may be verified only after the reception of any message M' sent in the period j+1, which includes key $K_j$. After reception of message M' a receiver verifies key $K_j$ using $K_0 = H_j(K_j)$ or $K_{j-1} = H(K_j)$ and verifies MIC in message M using key $K_j$. Accordingly, when the verification of the MIC and the verification of the key are all successful, the message is authenticated and considered trustworthy.

According to the TESLA scheme, the receiver cannot instantly perform the authentication at a point in time in which the broadcast frame is received from the sender. Instead, the receiver performs the authentication only after the frame from next interval is received. Accordingly, the TESLA scheme suffers from certain drawbacks such as delayed authentication due to the time difference between the data reception and the authentication.

Accordingly, there is a need for an improved system and method for protecting a frame broadcasted through a packet switching network by authenticating a frame based on a TESLA scheme.

SUMMARY OF THE INVENTION

An aspect of exemplary embodiments of the present invention is to address at least the above problems and/or disadvantages and to provide at least the advantages described below. Accordingly, an aspect of an exemplary embodiment of the present invention is to provide a method for protecting a broadcast frame that protects a frame broadcasted through a packet switching network by authenticating a frame based on a TESLA scheme.

In order to achieve the above-described aspects of exemplary embodiments of the present invention, a method for protecting a broadcast frame through an authentication of the frame broadcasted between a transmitting station and a receiving station is provided. A frame is generated in a frame generation step to include a message, a frame number, security key of a current frame and a message integrity code (MIC). The security key and the MIC are encrypted in the frame encryption step by using a verification key in order to protect the data frame. The protected data frame is transmitted in a frame transmission step.

In the frame generation step, the frame may include a message and a frame number, and the MIC may include the security key and the key chain of the current frame. The key chain may include the security key $K_{j-1}$ and the message M of the present frame j and the previous frame.

In the frame encryption step, the verification key $K0$ is obtained by substituting the security key $K1$ of the first frame in the hash function h, and the following equation is obtained:

$K_{j-1} = H(K_j)$, wherein j is a predetermined value.

Additionally, the protected broadcast frame Pj may be obtained by the following equation:

$P_j = [M_j\|j\|E(K_0, K_j\|MIC(K_j, M_j\|j))]$

The frame generation step generates the frame based on TESLA scheme.

According to another aspect of an exemplary embodiment of the present invention, a method for protecting a broadcast frame through an authentication of the frame broadcasted between a transmitting station and a receiving station is provided. A broadcast frame that includes a message, a frame number and encrypted security key of a current frame and a message integrity code (MIC) is received in a frame reception step. The security key and the MIC are decrypted in a frame decryption step from the received frame by using a verification key. A verification is made to confirm that security key belongs to key chain and a message corresponds to a message integrity code in a frame verification step.

The broadcast frame may include a message and a frame number.

The security key and the MIC are encrypted using the verification key.

Other objects, advantages and salient features of the invention will become apparent to those skilled in the art from the following detailed description, which, taken in conjunction with the annexed drawings, discloses exemplary embodiments of the present invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which:

FIG. 2 is a flowchart illustrating the authentication of the frame broadcasted between a transmitting station and a receiving station by generating a broadcast frame according to an exemplary embodiment of the present invention.

FIG. 3 is a flowchart illustrating the authentication of the frame broadcasted between a transmitting station and a receiving station by receiving a broadcast frame according to an exemplary embodiment of the present invention.

Throughout the drawings, the same drawing reference numerals will be understood to refer to the same elements, features and structures.

DETAILED DESCRIPTION OF EXEMPLARY EMBODIMENTS

Figure 1:
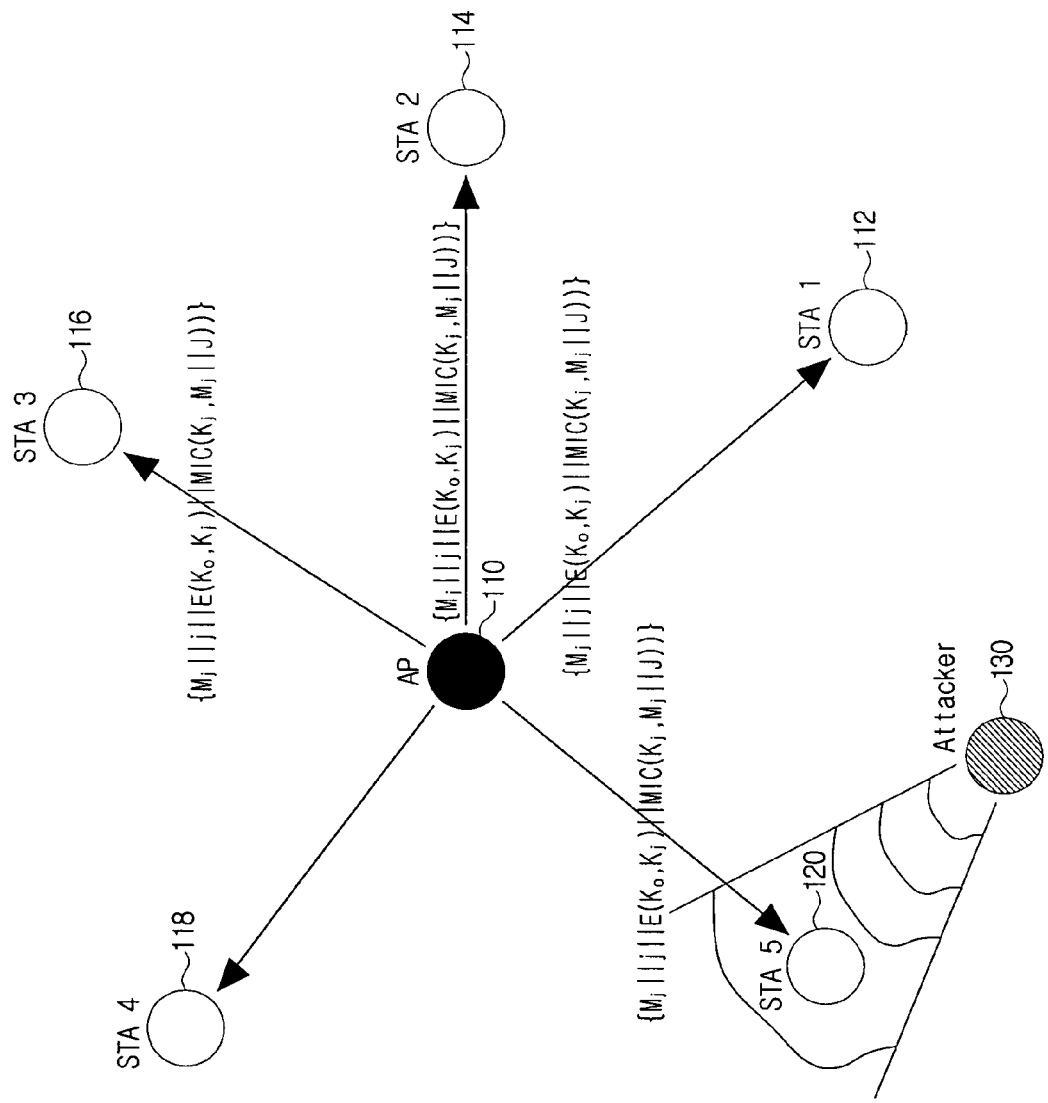
FIG. 1 is a view schematically illustrating the construction of a wireless LAN system for explaining a method for protecting a broadcast frame according to an exemplary embodiment of the present invention.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

According to an exemplary embodiment of the present invention, a security key includes a master key (MK), a pair-wise master key (PMK), and a pair-wise transient key (PTK).

The PMK is generated from the MK by an authentication, authorization and accounting (AAA) server that is an upper server constituting a distribution system (DS), and is transferred to terminals through a corresponding access point (AP).

The PTK is generated from the PMK by the AP and the terminals. The MK is used for the security between the terminals and the AP in addition to the AAA server. The PTK is used as a key confirmation key (KCK), a key encryption key (KEK), and a temporal key. In this case, $0^{th}$ to $127^{th}$ bits among bits constituting the PTK are used for the KCK, $128^{th}$ to $255^{th}$ bits are used for the KEK, and the remaining bits are used for the temporal key.

FIG. 1 is a view schematically illustrating the construction of a wireless LAN system for explaining a method for protecting a broadcast frame according to an exemplary embodiment of the present invention.

In an exemplary embodiment of the present invention, the wireless LAN system includes a plurality of terminals 112 to 120, an AP 110, and an attacker 130.

The AP 110 broadcasts a group temporal key (GTK) to all the terminals 112 to 120 in a related process. Data which is broadcast between the AP 110 and the terminals 112 to 120 is protected by the GTK. The AP 110 simultaneously performs a wireless-area communication with the terminals 112 to 120 and a wire-area communication with the Internet environments, and serves as a bridge for transferring wireless-area data to a wire communication area such as the Internet.

Any terminal, like the AP 110, can activate and transmit the broadcast data frame.

However, respective nodes including the attacker 130 cannot confirm the actual source node of the broadcast frame. Accordingly, the attacker 130 can hack the respective terminals 112 to 120 by using the GTK received from the AP 110. In this case, a management frame that is used to provide the function of a network should have stronger protection.

In an exemplary embodiment of the present invention, an authentication of the respective terminals 112 to 120 that intend to use the wireless LAN system and a security of the wireless data being transmitted between the terminals 112 to 120 and the AP 110 are the core elements that constitute a wireless LAN security system. Accordingly, the IEEE 802.11i Task Group has discussed procedures for establishing the standard for a wireless-area encryption technology. In the IEEE 802.11X standard, a state machine for an authentication of a wireless LAN user and an exchange of an encryption key to be used in a wireless area has been defined, and in the IEEE 802.11i standard, an algorithm using an exchanged wireless-area encryption key has been standardized.

In FIG. 1, the terminals 112 to 120 should be authenticated as rightful users by an authentication server (AAA: not illustrated) to use an Internet service through the AP 110. When an authentication message is transmitted from the AP 110 to the authentication server, wireless-area data is transmitted between the terminal and the AP 110. The AP 110 reconstructs an authentication message frame that can be recognized by the authentication server, and transmits wire-area data to the authentication server.

According to an exemplary implementation, an authentication protocol simultaneously performs the user authentication and the key exchange. For example, a transport layer security (TLS) protocol, which is one of the authentication protocols, is extended to extensible authentication protocol (EAP)-TLS protocols, so that they may be used as diverse authentication protocols. If the authentication has succeeded using the EAP-TLS protocol, the authentication server authenticates the respective terminals 112 to 120. The authentication server and the respective terminals 112 to 120 also share a master session key. The authentication server transfers the master session key to the AP 110, and the AP 110, which has received the master session key, exchanges a wireless-area encryption key to actually be used in the wireless area with the respective terminals 112 to 120, using the master session key.

With reference to FIG. 2, the AP 110 generates a broadcast frame in step 200 that includes a security key and an MIC regarding the current frame j and the previous frame j−1 based on TESLA scheme, where all messages M broadcasted by the AP 110 to the plurality of terminals 112 to 120 include a message, a frame number j, security key Kj−1 of the previous frame, and an MIC as the following equation:

$$M => M\|j\|K_{j-1}\|MIC(K_j,j\|K_{j-1}\|M) \tag{1}$$

Here, M denotes a message, j a frame number, K a security key, and MIC a message integrity code, respectively.

All security keys $K_{j-1}$ are interconnected via hash function H as expressed by Equation (2)

$$K_{j-1}=H(K_j) \tag{2}$$

The verification key $K_0$ is obtained by substituting the security key $K_1$ of the first frame in the hash function H.

The AP 110 uses the security key $K_1$ to verify the MIC.

The AP 110 encrypts the security key and the MIC using the verification key to protect the data frame in step 201 according to the IEEE 802.11i standard from an external attacker and generates the encrypted data frame $P_j$ as expressed in Equation (3).

$$P_j=[M_j\|j\|E(K_0,K_j\|MIC(K_j,M_j\|j))] \tag{3}$$

Here, $P_j$ denotes a protected broadcast frame, j a frame number, E an encryption algorithm, $K_0$ verification key, $K_j$ a security key, $M_j$ a message of frame j, and MIC a message integrity code, respectively.

All security keys Kj−1 of the previous frame are obtained. The security key Kj of the present frame for a one-way hash function H as expressed by Equation (4).

$$K_{j-1}=H(K_j) \tag{4}$$

The verification key K0 is a legal device when $K_0=H(K_1)=H(K_2)=\ldots=h(K_n)$.

The AP 110, which has obtained the protected broadcast frame as described above, broadcasts the protected frame to all the terminals 112 to 120 in step 202 including the attacker 130.

With reference to FIG. 3, the terminals 112 to 120 including the attacker 130 receive the protected frame broadcasted from the AP 110 in step 300. Here, the broadcast frame includes a message, a frame number, security key and an MIC, where security key and an MIC are encrypted using verification key K0.

The respective terminals 112 to 120 decrypt the security key and the MIC from the broadcast frame by using the verification key in step 301, verify that security key belongs to the key chain as expressed by Equation (4) and authenticate the received frame by verification that data corresponds to the message integrity code in step 302. All these operations may be done when the broadcast frame is received. Accordingly, the respective terminals 112 to 120 may authenticate the broadcast frame in real time.

As described above, according to an exemplary embodiment of the present invention, the time difference caused by the authentication of the broadcast frame can be removed, and thus the authentication of the broadcast frame can be performed in real time.

While the present invention has been shown and described with reference to certain exemplary embodiments thereof, it will be understood by those skilled in the art that various changes in form and details may be made therein without departing from the spirit and scope of the invention ad defined by the appended claims and their equivalents.

What is claimed is:

1. A method, of a transmitting station, for protecting a broadcast frame through an authentication of a frame broadcasted between the transmitting station and a receiving station, the method comprising:
   generating a current broadcast frame based on a timed efficient stream loss-tolerant authentication (TESLA) scheme, the current broadcast frame comprising a message, a current broadcast frame number j, a security key of the current broadcast frame, and a message integrity code (MIC) regarding the security key of the current broadcast frame, and a security key of a previous broadcast frame;
   protecting the current broadcast frame by encrypting the security key of the current broadcast frame and the MIC using a verification key; and
   transmitting the protected current broadcast frame.

2. The method of claim 1, wherein in generating the current broadcast frame, the MIC comprises the security key of the current broadcast frame and a key chain of the current broadcast frame.

3. The method of claim 2, wherein the key chain comprises a security key $K_{j-1}$, a message M of the current broadcast frame j, and a message M of a previous broadcast frame j−1.

4. The method of claim 1, wherein during encrypting, a verification key $K_0$ is obtained by substituting a security key $K_1$ of the current broadcast frame in hash function h.

5. The method of claim 1, wherein a protected broadcast frame $P_j$ is obtained by the following equation:

$$P_j = [M_j \| j \| E(K_0, K_1 \| MIC(K_j, M_j \| j))],$$

where M is the message, j is the frame number, $K_0$ is a verification key, and $K_1$ is the security key of the current broadcast frame.

6. A method, of a receiving station, for protecting a broadcast frame through an authentication of a frame broadcasted between a transmitting station and the receiving station, the method comprising:
   receiving a current broadcast frame that is generated based on a timed efficient stream loss-tolerant authentication (TESLA) scheme, the current broadcast frame comprising a message, a current broadcast frame number j, a security key of the current broadcast frame, and a message integrity code (MIC) regarding the security key of the current broadcast frame and a security key of a previous broadcast frame, wherein the security key and the MIC are encrypted using a verification key;
   decrypting the security key of the current broadcast frame and the MIC from the received current broadcast frame using the verification key; and
   verifying that the decrypted security key of the current broadcasts frame belongs to a key chain and that the message and frame number correspond to the MIC.

7. The method of claim 6, wherein the MIC comprises a security key $K_j$ and the key chain of the current broadcast frame.

8. The method of claim 7, wherein the key chain comprises a security key $K_{j-1}$ and a message M of the current broadcast frame and a message M of a previous broadcast frame.

9. The method of claim 6, wherein a verification key $K_0$ is obtained by substituting a security key $K_1$ of a first frame in hash function h.

* * * * *